Dec. 11, 1951
H. M. GRIFFITHS
2,578,351
METHOD OF MAKING ROCK DRILL BITS
Filed Oct. 25, 1948
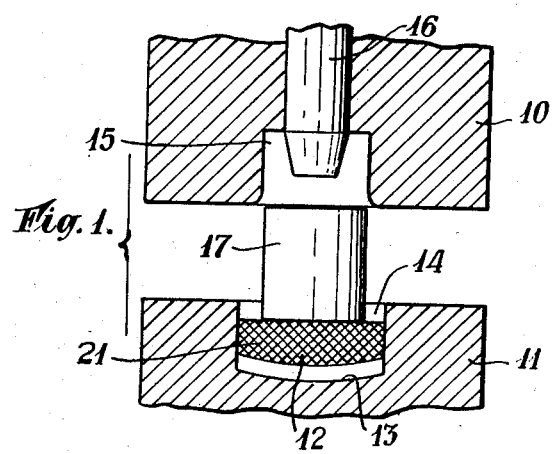
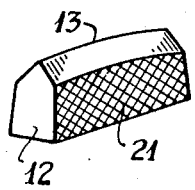
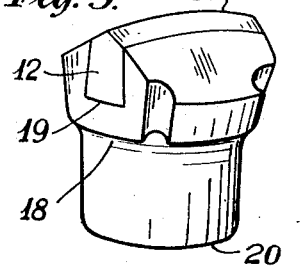
Hugh Manton Griffiths
By Fraser, Myers Manley
Attys.

Patented Dec. 11, 1951

2,578,351

UNITED STATES PATENT OFFICE 2,578,351

METHOD OF MAKING ROCK DRILL BITS

Hugh Manton Griffiths, Bradway, near Sheffield, England, assignor to Rip-Bits, Limited, Sheffield, England, a company of Great Britain and Northern Ireland Application October 25, 1948, Serial No. 56,362
In Great Britain October 27, 1947

1 Claim. (Cl. 76—108)

This invention relates to improvements in detachable drill-bits of the percussive type, having one or more "hard metal" tips to constitute the cutting edge or edges thereof.

Hitherto, these "hard metal" tips have been accommodated, as preformed inserts, in complementary grooves formed in the cutting end of the drill-bit and are secured in position therein by brazing or low temperature welding.

The expression "hard metal" as herein used is intended to cover extremely hard materials such as carbides of tungsten or the like, sintered materials of different composition, nitrided ferrous materials, or the like.

In order to obtain the required accurate fit of the inserts in their grooves for efficient use, an appreciable amount of accurate work in fitting grinding and machining must be resorted to, which thereby increases the cost of production of drilling tools of this type.

An object of this invention is to provide the more simple method of applying an insert in the drill by embedding it therein during forging of the drill to its final shape.

A further object is to provide that an insert will key itself in position when becoming embedded in the drill during the forging operation.

According to the invention broadly, a "hard metal" tip insert for a drill-bit of the type referred to, is applied by a forging process in which the drill-bit end is forged around the "hard metal" insert or inserts which is or are held in a die, in such a manner that said insert or inserts is or are permanently embedded in position to provide the cutting edge or edges of the tool.

Preferably, the said forging operation to embed the insert or inserts, is done simultaneously with the operation of forging the drill-bit to the required shape, which operation is done by the use of coacting dies in which a heated metal slug end is pressed to shape under extreme pressure about the insert or inserts previously placed in one of the dies and seating in a recess therein.

According to one method of carrying out the invention, the hard metal insert or inserts is or are located in a suitable recess or recesses in the bottom die, should a vertical forging machine be used, or in the heading die should a horizontal forging machine be used, which dies are adapted for shaping the front end of the drill-bit. During the first stage of the operation cycle, the heated slug in the case of a drill-bit, is forced on to the insert or inserts, as it or they is or are held in the die so that the heated metal flows around the sides thereof, and thereby embraces the or each insert so as to leave an edge or edges thereof exposed to form the cutting edge or edges of the drill-bit.

Thereafter, as a second stage of the operation, the drill-bit end is forged to its required final shape by a suitable top die, co-acting with the aforesaid bottom die.

The accurate sizing of the inserts is unnecessary as the holding metal conforms exactly to any irregularity in the shape thereof.

To prevent movement of the insert once it has been forced into position in the heated metal, the sides of said insert may be tapered, roughened, fluted or striated so as to form a key for the heated metal. Alternatively, or additionally, the hard metal insert may be fixed in position by applying a coating of brazing metal to the side walls and base thereof, prior to the forging operation. In this case, the brazing metal is so chosen that the forging temperature of the slug is sufficient to melt the brazing metal so as thereby to form a brazed joint between the contacting surfaces. The coating of brazing metal may be applied by dipping the insert in liquid brazing metal or by an electro-deposition or spraying process upon the insert before placing it in the dies.

The accompanying drawing is diagrammatically illustrative of one method of carrying out this invention and although the method now to be described as applied to the manufacture of a detachable drill-bit, it is to be understood that it is by way of selection only and not by limitation.

In the drawing:

Fig. 1 is a sectional part elevation of a pair of top and bottom dies showing a preformed "hard metal" insert and heated metal slug in position ready for the forging operation to produce the drill-bit.

Fig. 2 is a perspective view of the insert, and

Fig. 3 is a perspective view of the finished drill-bit.

In Fig. 1, the numerals 10 and 11 indicate coacting top and bottom dies respectively and, as will be seen, the preformed insert 12 of substantially rectangular section, except for a V-shaped cutting edge 13, is located in an inverted position in the recess 14 of the bottom die with its cutting edge 13 and its ends in juxtaposition with the walls of said recess but otherwise exposed. The top die 10 is provided with a recess 15 and a central spigot member 16 which projects into said recess from the inner end thereof. The heated metal slug 17 is placed upon the insert 12.

as shown, and as the top die 10 is brought down to co-act with the bottom die 11, the metal of the slug is spread and thereby caused to flow around the exposed faces of the insert within the confines of the co-acting faces of the two dies and form the drill-bit 18, shown in Fig. 3, with the insert 12 embedded in the resulting groove 19 with its edge 13 forming the cutting edge in the front cutting end of the drill-bit, while the rear end of the drill-bit is formed as a socketed drill-rod abutment end 20 by the penetrating action of the spigot member 16.

As is shown in Fig. 2, the sides of the "hard metal" insert 12 taper inwardly from the base so that said insert becomes fastened in dovetail fashion in the groove 19 and is thereby held against subsequent displacement axially of the drill-bit. The side faces of the insert may also be roughened as shown at 21 to prevent subsequent displacement longitudinally of the groove 19. In addition, the side faces as well as the base of the insert may be coated with a layer of brazing material adapted, under the heat of the forging operation, to melt or become sufficiently plastic to effect a brazed joint between the insert 12 and the walls of the groove 19.

What I claim and desire to secure by Letters Patent is:

The method of manufacturing a percussive rock drill wherein the cutting edge thereof is constituted of at least one hard metal insert, which comprises forging a heated metal member about a hard metal insert between a pair of co-acting dies, one formed with a recess which is complemental to the working face of the drill end and the other of which is formed with a recess and a plunger movable therein, by first placing in the recess of the die which is complemental to the working face of the drill end the preformed hard metal insert with its cutting edge and two opposite end faces confined in juxtaposition with the walls of such recess and with the basal face and two opposite side faces of said insert exposed in said recess, then placing the heated metal member upon the basal face of the insert and subjecting said heated member to a forging action between the dies to spread the metal of the heated member around the exposed faces of the insert, thereby to form a drill bit having a rear drill-rod abutment end and a front cutting end with the insert exposed thereat to form a cutting edge thereof.

HUGH MANTON GRIFFITHS.

REFERENCES CITED

The following references are of record in the file of this patent:

UNITED STATES PATENTS

| Number | Name | Date |
|---|---|---|
| 653,165 | Bedford et al. | July 3, 1900 |
| 879,631 | Gregson | Feb. 18, 1908 |
| 1,054,181 | Davenport | Feb. 25, 1913 |
| 1,179,753 | Parrock | Apr. 18, 1916 |
| 1,339,152 | Arnold | May 4, 1920 |
| 1,518,856 | Lapp | Dec. 9, 1924 |
| 1,843,549 | Firth | Feb. 2, 1932 |
| 1,902,513 | Meutsch | Mar. 21, 1933 |
| 1,929,608 | Rea | Oct. 10, 1933 |
| 1,952,388 | Simons | Mar. 27, 1934 |
| 1,974,215 | Kilmer | Sep. 18, 1934 |
| 2,307,853 | Palm | Jan. 12, 1943 |
| 2,318,326 | Padley et al. | May 4, 1943 |
| 2,418,338 | Dworkowski et al. | Apr. 1, 1947 |

FOREIGN PATENTS

| Number | Country | Date |
|---|---|---|
| 189,583 | Germany | Oct. 14, 1907 |